United States Patent
Lee

(10) Patent No.: US 10,619,736 B2
(45) Date of Patent: Apr. 14, 2020

(54) APPARATUS AND METHOD FOR LEARNING GEAR RATIO CONTROL OF CVT

(71) Applicant: HYUNDAI AUTRON CO., LTD., Seongnam-si (KR)

(72) Inventor: Jun-Hyung Lee, Anyang-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 0 days.

(21) Appl. No.: 16/165,101

(22) Filed: Oct. 19, 2018

(65) Prior Publication Data
US 2019/0120373 A1 Apr. 25, 2019

(30) Foreign Application Priority Data
Oct. 24, 2017 (KR) .................. 10-2017-0138694

(51) Int. Cl.
*F16H 61/662* (2006.01)
*F16H 59/18* (2006.01)
*F16H 59/70* (2006.01)
*F16H 61/00* (2006.01)

(52) U.S. Cl.
CPC .......... *F16H 61/662* (2013.01); *F16H 59/18* (2013.01); *F16H 59/70* (2013.01); *F16H 2059/186* (2013.01); *F16H 2059/704* (2013.01); *F16H 2061/0087* (2013.01); *F16H 2061/66213* (2013.01)

(58) Field of Classification Search
CPC ......... F16H 61/662; F16H 2061/66213; F16H 2061/0087; F16H 59/18; F16H 59/70; F16H 2059/186; F16H 2059/704
See application file for complete search history.

(56) References Cited

U.S. PATENT DOCUMENTS 6,013,006 A 1/2000 Ashizawa
2005/0221929 A1 10/2005 Oshita
(Continued)

FOREIGN PATENT DOCUMENTS

CN 1995782 A 7/2007
CN 103174828 A 6/2013
(Continued)

OTHER PUBLICATIONS

Office Action, Chinese Patent Application No. 201811228335.3, Chinese Intellectual Property Office, dated Jan. 21, 2020, China.

*Primary Examiner* — Huan Le
(74) *Attorney, Agent, or Firm* — Baker & Hostetler LLP; Hyunho Park

(57) ABSTRACT

An apparatus for learning gear ratio control of a CVT (Continuously Variable Transmission) may include: an APS (Acceleration Position Sensor) configured to detect a change of an accelerator pedal in a CVT vehicle; a gear ratio detector configured to detect a pulley gear ratio of the CVT; a timer configured to measure the time during which gear ratio control learning is performed during power-off up-shift of the CVT; and a controller configured to receive the values detected through the APS, the gear ratio detector and the timer, and control the CVT to shift gears at a target gear ratio learned through the gear ratio control learning, during the power-off up-shift by coasting.

17 Claims, 4 Drawing Sheets

(56) References Cited

U.S. PATENT DOCUMENTS

| | | | |
|---|---|---|---|
| 2010/0167871 A1* | 7/2010 | Inagaki | B60K 6/48 477/5 |
| 2011/0015840 A1* | 1/2011 | Takahashi | F16H 61/061 701/58 |
| 2017/0138473 A1* | 5/2017 | Fukao | F16H 61/66259 |

FOREIGN PATENT DOCUMENTS

| | | |
|---|---|---|
| DE | 4330391 A1 | 10/1994 |
| DE | 10020803 A1 | 8/2001 |
| JP | 11-051170 A | 2/1999 |
| JP | 2000-009223 A | 1/2000 |
| KR | 10-2006-0108867 A | 10/2006 |

* cited by examiner

APPARATUS AND METHOD FOR LEARNING GEAR RATIO CONTROL OF CVT

CROSS-REFERENCES TO RELATED APPLICATIONS

The present application claims priority to Korean application number 10-2017-0138694, filed on Oct. 24, 2017, which is incorporated by reference in its entirety.

BACKGROUND OF THE INVENTION

The present invention relates to an apparatus and method for learning gear ratio control of a CVT (Continuously Variable Transmission), and more particularly, to an apparatus and method for learning CVT gear ratio control, which can prevent a problem through target gear ratio control learning, the problem occurring when a turbine shift curve is delayed or advanced during pulley gear shifting in which a gear ratio is significantly changed due to the driving state of a CVT vehicle or the wear and deterioration of a contact surface between a pulley and a belt.

In general, an automatic transmission vehicle is driven under control of an electronic controller referred to as a TCU (Transmission Control Unit), and the TCU controls overall operations of the automatic transmission. At this time, the TCU electronically controls the automatic transmission to shift gears according to the velocity of the vehicle and the throttle opening degree. When the vehicle is driven by the power of the engine during the gear shifting, the state is referred to as a power-on state. When the vehicle is not driven by the power of the engine, but driven by the inertia of the vehicle (coasting), the state is referred to as a power-off state. Since an engine RPM, engine torque and engine power are different during the power-on state and the power-off state, gear shifting controls suitable for the power-on state and the power-off state need to performed.

In general, when a driver takes his foot off the accelerator pedal during driving (lift foot up), the operation state of the vehicle is switched from the state in which the engine drives the vehicle into the power-off state in which the vehicle drives the engine, and the speed stage is changed to a high-speed stage higher by one or more stages than the current speed stage. At this time, the number of turbine revolutions decreases, and gear shifting control accompanied in this case is typically referred to as power-off up-shift.

For example, a typical automatic transmission is automatically synchronized with a target speed stage through a gear shifting pattern of a map table, which is set according to changes of the vehicle velocity and the throttle opening degree. The automatic transmission applies the power-off up-shift control method which changes the speed stage to a speed stage higher by one or more stages than the current speed stage, in order to exclude an occurrence of shock by an instantaneous engine power reduction in case of the power-off state in which the driver takes the foot off the accelerator pedal.

In the existing CVT, however, a gear ratio control learning process for specific pulley gear shifting is not performed, but only a pulley control pressure learning process of comparing control pressures and pressure sensor values of a driving shaft and driven shaft in the parking position P or neutral position N is performed as a learning process used for the pulley. Since the gear ratio control learning process for pulley gear shifting is not performed, gear shifting correction into which a driver's intention is reflected depending on the wear of the transmission or the surrounding environment is not performed. Therefore, the gear shifting of the transmission may delayed or rapidly performed to cause a shock during the gear shifting control.

Therefore, the gear ratio control learning is required to perform transmission control into which a driver's intention (for example, an intention to coast the vehicle) is more reliably reflected, through the target gear ratio control learning process (i.e. learned target gear ratio).

The related art of the present invention is disclosed in Korean Patent Publication No. 10-2006-0108867 published on Oct. 18, 2006 and entitled "Power-off up-shift control method of automatic transmission vehicle".

BRIEF SUMMARY

Embodiments of the present invention are directed to an apparatus and method for learning CVT gear ratio control, which can prevent a problem through target gear ratio control learning, the problem occurring when a turbine shift curve is delayed or advanced during pulley gear shifting in which a gear ratio is significantly changed due to the driving state of a CVT vehicle or the wear and deterioration of a contact surface between a pulley and a belt.

In one embodiment, an apparatus for learning gear ratio control of a CVT may include: an APS (Acceleration Position Sensor) configured to detect a change of an accelerator pedal in a CVT vehicle; a gear ratio detector configured to detect a pulley gear ratio of the CVT; a timer configured to measure the time during which gear ratio control learning is performed during power-off up-shift of the CVT; and a controller configured to receive the values detected through the APS, the gear ratio detector and the timer, and control the CVT to shift gears at a target gear ratio learned through the gear ratio control learning, during the power-off up-shift by coasting.

The learned target gear ratio may indicate a target gear ratio by which a slope indicating a time required to reach the target gear ratio with respect to the current gear ratio is adjusted to a gentle or steep slope, in order to prevent a rapid change of the current gear ratio when the current gear ratio is controlled to follow the target gear ratio.

The controller may check whether an APS change is smaller than a preset APS value or a target gear ratio change is smaller than a preset gear ratio change, and determines a power-off up-shift point by coasting.

During the power-off up-shift by coasting, the controller may enter the gear ratio control learning, capture the current gear ratio and the target gear ratio, and operate the timer to check a gear shifting time.

When the absolute value of a difference between a target gear ratio corresponding to the current driving situation and a target gear ratio captured at the point of time to enter the gear ratio control learning is larger than a first gear ratio, the controller may determine that the power-off up-shift by coasting was removed, and stop the gear ratio control learning.

When the absolute value of a difference between a target gear ratio corresponding to the current driving situation and a target gear ratio captured at the point of time to enter the gear ratio control learning is smaller than a first gear ratio, the controller may continuously increase the timer value to check the gear shifting time while the learning is performed.

The controller may compare the absolute value of the difference between the current gear ratio and the target gear ratio captured at the point of time to enter the gear ratio control learning to a second gear ratio, compare the timer value to a preset timer value 1 when it is determined that the current ratio approaches the target gear ratio captured at the point of time to enter the gear ratio control learning within a preset range, determine that the gear ratio was too early changed when the timer value is smaller than the timer value 1, and control the slope of the learned target gear ratio to a more gentle slope than the slope of the target gear ratio.

When the timer value is between the timer value 1 and a preset timer value 2, the controller may determine that the gear ratio was changed at a designated suitable time, and maintain the slope of the learned target gear ratio at the current slope.

When the timer value is larger than the timer value 2, the controller may determine that the gear ratio was changed after the designated suitable time, and increase the slope of the learned target gear ratio to a slope close to the target gear ratio.

In another embodiment, a method for learning gear ratio control of a CVT may include: detecting, by an APS, a change of an accelerator pedal in a CVT vehicle; detecting, by a gear ratio detector, a pulley gear ratio of the CVT; measuring, by a timer, the time during which gear ratio control learning is performed, during power-off up-shift of the CVT; and receiving, by a controller, the values detected through the APS, the gear ratio detector and the timer, and controlling the CVT to shift gears at a target gear ratio learned through the gear ratio control learning during the power-off up-shift by coasting.

In order to determine a power-off up-shift point by coasting, the controller may check whether the APS change is smaller than a preset APS value, and a target gear ratio change is smaller than a preset gear ratio change.

During the power-off up-shift by coasting, the controller may enter the gear ratio control learning, capture the current gear ratio and the target gear ratio, and operate the timer to check a gear shifting time.

When the absolute value of a difference between a target gear ratio corresponding to the current driving situation and a target gear ratio captured at the point of time to enter the gear ratio control learning is larger than a first gear ratio, the controller may determine that the power-off up-shift by coasting was removed, and stop the gear ratio control learning.

When the absolute value of a difference between a target gear ratio corresponding to the current driving situation and a target gear ratio captured at the point of time to enter the gear ratio control learning is smaller than a first gear ratio, the controller may continuously increase the timer value to check the gear shifting time while the learning is performed.

The controller may compare the absolute value of the difference between the current gear ratio and the target gear ratio captured at the point of time to enter the gear ratio control learning to a second gear ratio, compare the timer value to a preset timer value 1 when it is determined that the current ratio approaches the target gear ratio captured at the point of time to enter the gear ratio control learning within a preset range, determine that the gear ratio was too early changed when the timer value is smaller than the timer value 1, and control the slope of the learned target gear ratio to a more gentle slope than the slope of the target gear ratio.

When the timer value is between the timer value 1 and a preset timer value 2, the controller may determine that the gear ratio was changed at a designated suitable time, and maintain the slope of the learned target gear ratio at the current slope.

When the timer value is larger than the timer value 2, the controller may determine that the gear ratio was changed after the designated suitable time, and increase the slope of the learned target gear ratio to a slope close to the target gear ratio.

DETAILED DESCRIPTION

Hereafter, an apparatus and method for learning gear ratio control of a CVT (Continuously Variable Transmission) in accordance with an embodiment of the present invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
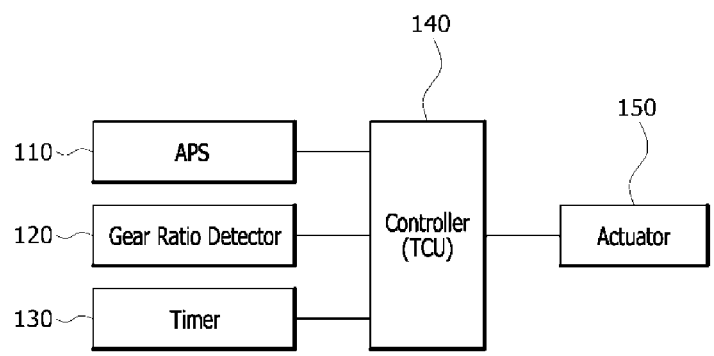
FIG. 1 illustrates a schematic configuration of an apparatus for learning gear ratio control of a CVT in accordance with an embodiment of the present invention.

FIG. 1 illustrates a schematic configuration of an apparatus for learning gear ratio control of a CVT in accordance with an embodiment of the present invention.

As illustrated in FIG. 1, the apparatus for learning gear ratio control of a CVT in accordance with the embodiment of the present invention may include an APS (Accelerator Position Sensor) 110, a gear ratio detector 120, a timer 130, a controller 140 and an actuator 150.

The APS 110 may detect the position (displacement) of an accelerator pedal.

For example, when a driver steps on the accelerator pedal, the APS attached on the accelerator pedal may sense the position (displacement) of the pedal, and transfer the sensed position to the controller 140. The controller 140 may calculate an opening degree of a throttle valve with another input signal, based on the APS information, and change the opening degree of the throttle valve to an opening degree suitable for the operation state of the engine by driving a motor attached on the throttle valve.

The gear ratio detector 120 may detect a pulley gear ratio of the CVT.

Figure 2:
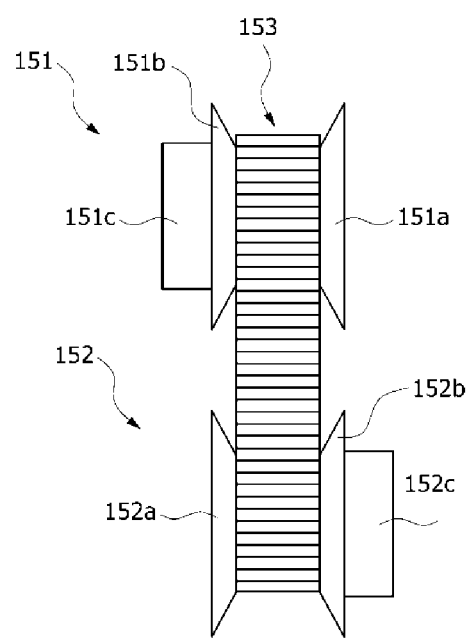
FIG. 2 illustrates an operation of an actuator of the CVT in FIG. 1.

For example, as illustrated in FIG. 2, the pulley of the CVT may include a first pulley (or driving pulley) 151 and a second pulley (or driven pulley) 152, and the pulley gear ratio may indicate the ratio of V-groove widths (or diameters) of the first and second pulleys 151 and 152.

The timer 130 may measure a gear shifting time while the gear ratio control learning process is performed, the gear shifting time indicating a time period from a learning start point to a learning end time.

The controller 140 may receive the values detected through the APS 110, the gear ratio detector 120 and the timer 130, and perform transmission control into which a driver's intention (for example, the driver's intention to coast the vehicle) is reflected, through the gear ratio control learning process during power-off up-shift in accordance with the embodiment of the present invention.

The actuator 150 may perform gear shifting at a learned target gear ratio while the gear ratio (or pulley gear ratio) is changed according to a control signal outputted from the controller 140.

The learned target gear ratio may indicate a target gear ratio at which a slope with respect to the target gear ratio (i.e. time required for reaching the target gear ratio) can be adjusted to a gentle or steep slope, in order to prevent a rapid gear ratio change when the current gear ratio is controlled to follow the target gear ratio.

For reference, as illustrated in FIG. 2, the actuator 150 of the CVT (variator) may include the first pulley (driving pulley) 151, the second pulley (driven pulley) 152 and a transmission belt 153. The CVT may be installed on a power transfer path between a driving shaft and a driven shaft.

The first pulley 151 may be installed on the driving shaft, and have a variable effective diameter. The second pulley 152 may be installed on the driven shaft, and have a variable effective diameter. The transmission belt 153 may be wound around the first and second pulleys 151 and 152 so as to extend between the first and second pulleys 151 and 152. The power may be transferred through a friction force between the first and second pulleys 151 and 152 and the transmission belt 153.

The first pulley 151 may include a fixed sheave 151a, a movable sheave 151b and a first hydraulic actuator 151c. The fixed sheave 151a may serve as a rotating body fixed to the driving shaft. The movable sheave 151b may serve as an input-side movable rotating body which can be moved in the axial direction while prevented from relatively rotating about the axial line of the driving shaft. The first hydraulic actuator 151c may generate a thrust to move the movable sheave 151b, in order to change the V-groove width between the fixed sheave 151a and the movable sheave 151b.

The second pulley 152 may include a fixed sheave 152a, a movable sheave 152b and a second hydraulic actuator 152c. The fixed sheave 152a may serve as a rotating body fixed to the driven shaft. The movable sheave 152b may serve as a driven-side movable rotating body which can be moved in the axial direction while prevented from relatively rotating about the axial line of the fixed sheave 152a. The second hydraulic actuator 152c may generate a thrust to move the movable sheave 152b, in order to change the V-groove width between the fixed sheave 152a and the movable sheave 152b.

Therefore, while the V-groove widths of the first and second pulleys 151 and 152 are changed or the diameters of the first and second pulleys 151 are substantially changed according to the change of the widths, the winding diameter (effective diameter) of the transmission belt 58 may be changed.

Thus, while the V-groove widths of the first and second pulleys 151 and 152 are changed or the diameters of the first and second pulleys 151 are substantially changed according to the change of the widths, the gear ratio (or speed ratio=rotational velocity of driving shaft/rotational velocity of driven shaft) may be continuously changed. For example, when the V-groove width of the first pulley 151 is decreased, the gear ratio may be decreased to up shift the CVT. On the other hand, when the V-groove width of the first pulley 151 is increased, the gear ratio may be increased to down shift the CVT.

Hereafter, the operation of the controller 140 will be described in more detail with reference to FIGS. 3 and 4.

Figure 3:
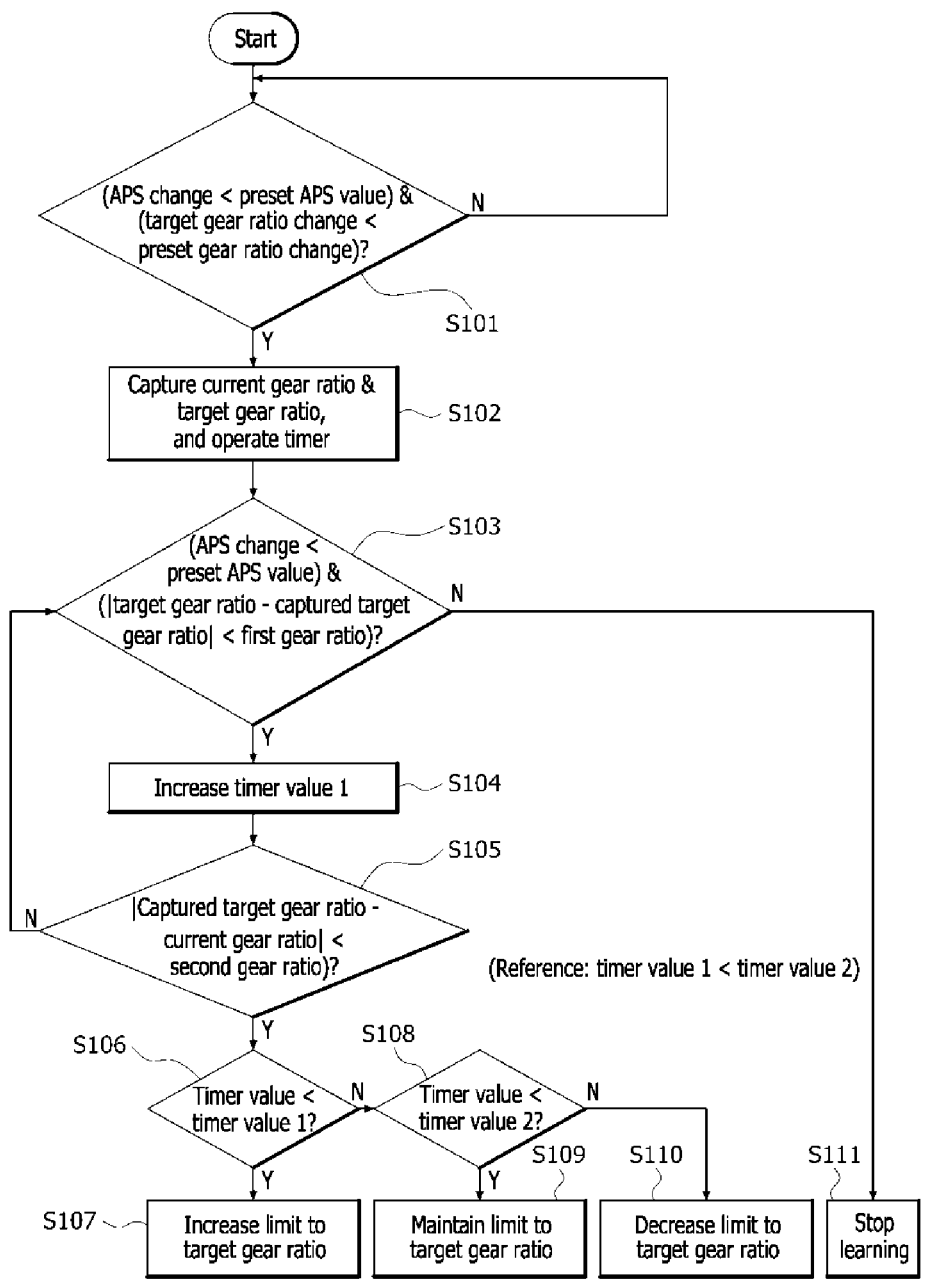
FIG. 3 is a flowchart illustrating a method for learning power-off up-shift of a CVT in accordance with the embodiment of the present invention.
Figure 4:
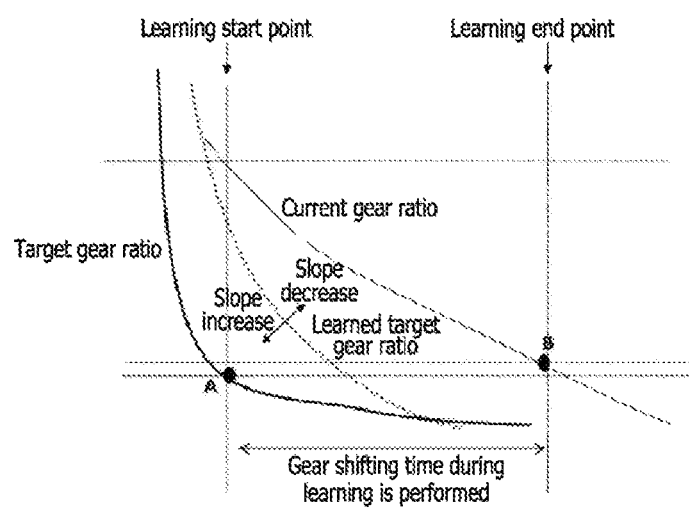
FIG. 4 is a graph illustrating the relation between a current gear ratio and learned target gear ratio and a target gear ratio, depending on a learning start and a learning end in FIG. 3.

FIG. 3 is a flowchart illustrating a method for learning power-off up-shift of a CVT in accordance with the embodiment of the present invention, and FIG. 4 is a graph illustrating the relation between a current gear ratio and learned target gear ratio and a target gear ratio, depending on the learning start and the learning end in FIG. 3.

Referring to FIG. 3, the controller 140 may check whether an APS change (i.e. the position of the accelerator pedal) is smaller than a preset APS value, and a target gear ratio change is smaller than a preset gear ratio change.

For example, when judging that the vehicle is driving at high speed, the driver may not step on the accelerator pedal to coast the vehicle. Therefore, the controller 140 may determine whether the driver has an intention to coast the vehicle or a power-off up-shift will occur, at step S101.

Thus, when the APS change (i.e. the position of the accelerator pedal) is smaller than the preset APS value and the target gear ratio change is smaller than the preset gear ratio change (Yes at step S101), or when the driver has an intention to coast the vehicle or a power-off up-shift will occur, the controller 140 may capture the current gear ratio and the target gear ratio (refer to (A) of FIG. 4), and simultaneously operate the timer 130, at step S102. That is, learning may be started.

When the APS change is still smaller than the preset APS value or the vehicle is still coasting, the controller 140 may check whether a difference between a target gear ratio corresponding to the current driving situation and the target gear ratio captured at the learning start point is smaller than a preset first gear ratio, at step S103. In reality, the absolute value of the difference may be applied.

For example, the controller 140 may check whether the driving situation of the coasting vehicle was not changed. When it is assumed that the vehicle is driving on a flat road, the target gear ratio corresponding to the current driving situation and the target gear ratio captured at the learning start point may be similar to each other without a significant difference or within a preset range. However, when the vehicle encounters an uphill road during coasting, the target gear ratio corresponding to the current driving situation will be changed. Thus, a large difference will occur between the target gear ratio corresponding to the current driving situation and the target gear ratio captured at the learning start point (A of FIG. 4).

Therefore, when the difference between the target gear ratio corresponding to the current driving situation and the target gear ratio captured at the learning start point is larger than the first gear ratio (No at step S103), it may indicate that the current driving situation was changed to a situation in which the vehicle cannot coast. Therefore, the controller 140 may stop the gear ratio control learning at step S111.

On the other hand, when the difference between the target gear ratio corresponding to the current driving situation and the target gear ratio captured at the learning start point is smaller than the first gear ratio (Y at step S103), it may indicate that the driving situation of the coasting vehicle was not changed. Therefore, the controller 140 may increase the timer value. That is, the timer value for checking the learning time may be increased by 1.

The controller 140 may check whether the difference between the target gear ratio corresponding to the current driving situation and the target gear ratio captured at the learning start point is smaller than a preset second gear ratio, at step S105.

For example, since it is determined at step S103 that the target gear ratio corresponding to the current driving situation and the target gear ratio captured at the learning start point are similar to each other without a large difference or within the preset range (the vehicle is coasting), the current gear ratio needs to follow (or converge to) the capture target ratio captured at the learning start time.

Therefore, at step S105, the controller 140 may check whether the current gear ratio has approached the target gear ratio captured at the learning start point within a preset range (for example, range corresponding to a difference between A and B of FIG. 4) or the gear ratio was changed to the target gear ratio.

At this time, the timer value may be increased until the current gear ratio approaches the target gear ratio captured at the learning start point within the preset range (for example, the range corresponding to the difference between A and B of FIG. 4) or is changed to the target gear ratio (steps S103 to S105 are repeated). Therefore, when the current gear ratio approaches the target gear ratio captured at the learning start point within the preset range or is changed to the target gear ratio (Y at step S105), the controller 140 may check whether the timer value is smaller than a preset timer value 1 (for example, 10 ms), at step S106.

That is, the controller 140 may check whether the time (timer value) required until the current gear ratio approaches the target gear ratio captured at the learning start point within the preset range (for example, the range corresponding to the difference between A and B of FIG. 4) or is changed to the target gear ratio is smaller than the timer value 1 (for example, 10 ms).

When the timer value is smaller than the preset timer value 1 of 10 ms (Y at step S106), it may indicate that the gear ratio was too early changed. In this case, since a shock may occur, the controller 140 may increase the limit to the target gear ratio (i.e. limit amount) at step S107.

For example, the slope of the learned target gear ratio in FIG. 4 may be restricted from following the slope of the target gear ratio. That is, the slope of the learned target gear ratio may be maintained at a more gentle slope than the target gear ratio.

When the timer value is larger than the timer value 1 of 10 ms (N at step S106), the controller 140 may check whether the timer value is smaller than a preset timer value 2 (for example, 20 ms), or check whether the timer value is equal to or larger than the timer value 1 and smaller than the timer value 2 (10 ms≤timer value<20 ms). When the timer value is between the timer value 1 and the timer value 2 (Y at step S107), it may indicate that the gear ratio was changed at a predefined suitable time. In this case, the controller 140 may maintain the limit to the target gear ratio (i.e. the limit amount).

For example, it may indicate that the slope of the learned target gear ratio in FIG. 4 is maintained at the current slope.

When the timer value is larger than the timer value 2 of 20 ms (No at step S108), it may indicate that the gear ratio was changed after the predefined suitable time. In this case, the controller 140 may decrease the limit to the target gear ratio (i.e. the limit amount) at step S110.

For example, it may indicate that the slope of the learned target gear ratio in FIG. 4 is changed to a slope close to the target gear ratio.

For reference, the timer values 1 and 2 of 10 ms and 20 ms are only examples for convenience of description, and not limited to specific values. Therefore, the timer values 1 and 2 may be changed to other values.

In accordance with the present embodiment, when a turbine shift curve is delayed or advanced during pulley shift in which the gear ratio is significantly changed due to the driving state of the CVT vehicle or the wear and deterioration of the contact surface between the pulley and the belt, the apparatus and method for learning gear ratio control can compensate for this state through the target gear ratio control learning process, thereby preventing occurrence of shock during gear shifting control while the gear shifting of the transmission is delayed or early performed.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for learning gear ratio control of a CVT (Continuously Variable Transmission), comprising:
   an APS (Acceleration Position Sensor) configured to detect a change of an accelerator pedal in a CVT vehicle;
   a gear ratio detector configured to detect a pulley gear ratio of the CVT;
   a timer configured to measure a time during which gear ratio control learning is performed during power-off up-shift of the CVT; and
   a controller configured to receive values detected through the APS, the gear ratio detector and the timer, and control the CVT to shift gears at a target gear ratio learned through the gear ratio control learning, during the power-off up-shift by coasting.

2. The apparatus of claim 1, wherein the learned target gear ratio indicates a target gear ratio by which a slope indicating a time required to reach the target gear ratio with respect to a current gear ratio is adjusted to a gentle or steep slope, in order to prevent a rapid change of the current gear ratio when the current gear ratio is controlled to follow the target gear ratio.

3. The apparatus of claim 1, wherein the controller checks whether an APS change is smaller than a preset APS value or a change of the target gear ratio is smaller than a preset gear ratio change, and determines a time point of the power-off up-shift by coasting.

4. The apparatus of claim 1, wherein during the power-off up-shift by coasting, the controller enters the gear ratio control learning, captures a current gear ratio and the target gear ratio, and operates the timer to check a gear shifting time.

5. The apparatus of claim 4, wherein when an absolute value of a difference between a target gear ratio corresponding to the current driving situation and a target gear ratio captured at the point of time to enter the gear ratio control learning is smaller than a first gear ratio, the controller continuously increases a timer value to check the gear shifting time while the learning is performed, the gear shifting time indicating a time period from a learning start to a learning end time.

6. The apparatus of claim 5, wherein the controller compares the absolute value of the difference between the current gear ratio and the target gear ratio captured at the point of time to enter the gear ratio control learning to a second gear ratio, compares the timer value to a first preset timer value when it is determined that the current ratio approaches the target gear ratio captured at the point of time to enter the gear ratio control learning within a preset range, determines that the pulley gear ratio was too early changed when the timer value is smaller than the first preset timer value, and controls a slope of the learned target gear ratio to a slope lower than a slope of the target gear ratio.

7. The apparatus of claim 6, wherein when the timer value is between the first preset timer value and a second preset timer value, the controller determines that the pulley gear ratio was changed at a designated time, and maintains the slope of the learned target gear ratio at the current slope.

8. The apparatus of claim 7, wherein when the timer value is larger than the second preset timer value, the controller determines that the pulley gear ratio was changed after the designated time, and increases the slope of the learned target gear ratio to a slope close to the target gear ratio.

9. The apparatus of claim 4, wherein when an absolute value of a difference between a target gear ratio corresponding to a current driving situation and a target gear ratio captured at the point of time to enter the gear ratio control learning is larger than a first gear ratio, the controller determines that the power-off up-shift by coasting terminates, and stops the gear ratio control learning.

10. A method for learning gear ratio control of a CVT, comprising:
   detecting, by an APS, a change of an accelerator pedal in a CVT vehicle;
   detecting, by a gear ratio detector, a pulley gear ratio of the CVT;
   measuring, by a timer, a time during which gear ratio control learning is performed, during power-off up-shift of the CVT; and
   receiving, by a controller, values detected through the APS, the gear ratio detector and the timer, and controlling the CVT to shift gears at a target gear ratio learned through the gear ratio control learning during the power-off up-shift by coasting.

11. The method of claim 10, wherein in order to determine a power-off up-shift point by coasting, the controller checks whether the APS change is smaller than a preset APS value, and a change of the target gear ratio is smaller than a preset gear ratio change.

12. The method of claim 10, wherein during the power-off up-shift by coasting, the controller enters the gear ratio control learning, captures a current gear ratio and the target gear ratio, and operates the timer to check a gear shifting time.

13. The method of claim 12, wherein when an absolute value of a difference between a target gear ratio corresponding to the current driving situation and a target gear ratio captured at the point of time to enter the gear ratio control learning is smaller than a first gear ratio, the controller continuously increases a timer value to check the gear shifting time while the learning is performed, the gear shifting time indicating a time period from a learning start point to a learning end time.

14. The method of claim 13, wherein the controller compares the absolute value of the difference between the current gear ratio and the target gear ratio captured at the point of time to enter the gear ratio control learning to a second gear ratio, compares the timer value to a first preset timer value when it is determined that the current ratio approaches the target gear ratio captured at the point of time to enter the gear ratio control learning within a preset range, determines that the pulley gear ratio was too early changed when the timer value is smaller than the first preset timer value, and controls a slope of the learned target gear ratio to a slope lower than a slope of the target gear ratio.

15. The method of claim 14, wherein when the timer value is between the first preset timer value and a second preset timer value, the controller determines that the pulley gear ratio was changed at a designated time, and maintains the slope of the learned target gear ratio at the current slope.

16. The method of claim 15, wherein when the timer value is larger than the second preset timer value, the controller determines that the pulley gear ratio was changed after the designated suitable time, and increases the slope of the learned target gear ratio to a slope close to the target gear ratio.

17. The method of claim 12, wherein when an absolute value of a difference between a target gear ratio corresponding to a current driving situation and a target gear ratio captured at the point of time to enter the gear ratio control learning is larger than a first gear ratio, the controller determines that the power-off up-shift by coasting terminates, and stops the gear ratio control learning.

* * * * *